Patented Mar. 25, 1941

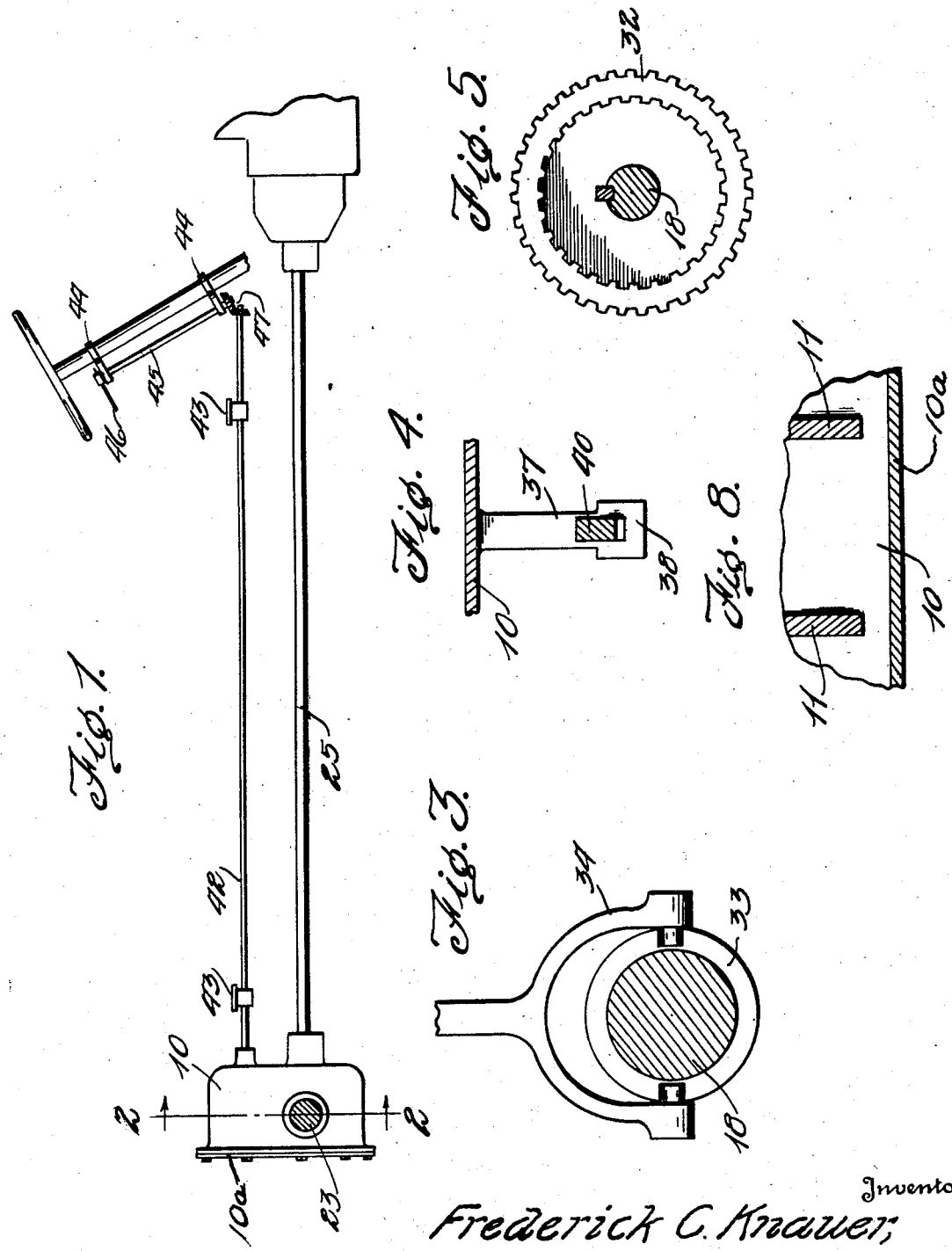

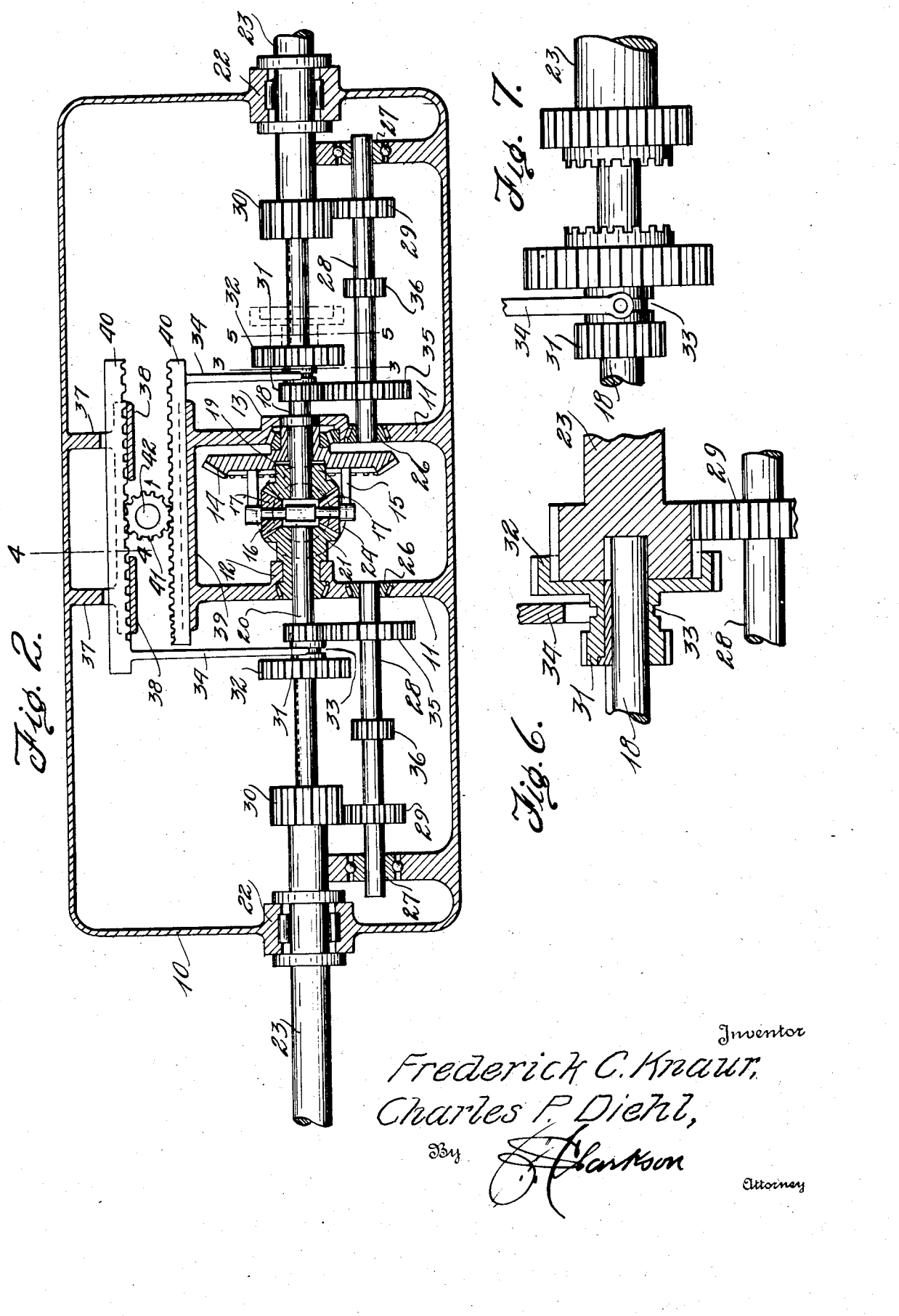

2,236,144

UNITED STATES PATENT OFFICE 2,236,144

REAR END GEAR SHIFT

Frederick C. Knauer, Berwyn, Md., and Charles P. Diehl, Washington, D. C.

Application May 27, 1940, Serial No. 337,504

6 Claims. (Cl. 74—327)

This invention relates to transmissions for motor driven vehicles and has special reference to a rear axle variable transmission particularly adapted for use in motor trucks and other heavy duty vehicles.

One important object of the invention is to provide a rear axle variable transmission whereby the long tail shaft of the vehicle may be, under heavy duty, relieved from excessive stress and thus the breakage so common to this part of the mechanism may be reduced to a minimum.

A second important object of the invention is to provide a device of this character which may be operated by a gear shift lever located at the front of the vehicle.

A third important object of the invention is to provide a device of this character wherein the rear wheels are simultaneously shiftable into the several gear positions.

A fourth important object of the invention is to provide a device of this character wherein removal of a cover plate will afford full access to the complete rear axle mechanism.

A fifth important object of the invention is to so design the rear axle mechanism that grease may pass from one end of the device to the other, thus requiring only the application of grease at one point when it is desired to renew or add to the grease already in the casing.

With the above and other objects in view the invention consists in general of certain novel details of construction and combinations of parts hereinafter fully described, illustrated in the accompanying drawings and specifically pointed out in the appended claims.

In the accompanying drawings like characters of reference indicate like parts in the several views, and—

Figure 1 is an outline view of those parts of a truck drive associated with this invention.

Figure 2 is an enlarged section on the line 2-2 of Figure 1.

Figure 3 is an enlarged section on the line 3—3 of Figure 2.

Figure 4 is an enlarged section on the line 4—4 of Figure 2.

Figure 5 is an enlarged section on the line 5—5 of Figure 2.

Figure 6 is an enlarged section on the line 6—6 of Figure 2.

Figure 7 is a view of a modified means for connecting the differential shafts and the axles for direct drive.

Figure 8 is a detailed horizontal section showing certain standards herein set back from the front plate whereby grease may pass from the middle to both ends in a free manner.

The rear axle housing 10 is provided centrally with a frame including a pair of upright members 11 provided respectively with alined bearing bosses 12 and 13. In the boss 13 is supported the hub of a bevel gear 14 which carries a spider 15 wherein is mounted a diametrically extending shaft 16 having a pair of confronting bevel gears 17 mounted thereon. In the boss of the gear 14 is journalled a shaft 18 on which is fixed a bevel gear 19 meshing with the bevel gears 17. In the bearing 12 is journalled a shaft 20 whereon is fixed a bevel gear 21 also meshing with the gears 17, the gears 19 and 21 facing each other. At each end of the housing 10 and alined with the shafts 18 and 20 are bearings 22 wherein are supported the rear axle sections 23 which carry the rear wheels 24. The inner ends of the axles are bored to receive the outer ends of the shafts 18 and 20. The gear 14 is driven in the usual manner by a pinion 24 mounted on the tail shaft 25 common to motor vehicles.

The gearing just described constitutes a type of the differential gearing used to permit one of the shafts 18 and 20 to travel faster than the other when making a turn.

In the lower part of each of the uprights 11 is provided a bearing 26 and at each end of the housing is provided an alined bearing 27. Alined jack shafts 28 are supported in the bearings 26 and 27 and adjacent the outer end of each of these jack shafts is fixed a gear 29 which constantly meshes with the outer part of a driven gear 30 fixed on the axle 23. On each shaft 18 and 20 there is splined a pair of gears 31 and 32, the gear 31 being smaller than the gear 32 while the latter is larger than the gear 30 and not only has external gear teeth but is hollow and internally toothed to fit on the gear 30 in one position of the gear 32. The gears 31 and 32 on each shaft have a hub in common so that they move together and the hub is grooved at 33 to receive a shipper fork 34 which will presently be described.

On each of the shafts 28 there is fixed a pair of spaced gears consisting of a larger inner gear 35 of proper size to mesh with the gear 31 and a smaller outer gear 36 of proper size to mesh with the gear 32. The gears 35 and 36 are so spaced that in one position of the combined gears 31 and 32 the gears 31 and 35 are in mesh, this being for low gear. In a second position gears 31 and 32 are out of mesh with gears 35 and 36 and lie between them, this being in neutral position.

In a third or overspeed position gears 32 and 36 and in direct gear the gear 32 fits over gear 30.

Alined with and spaced above the standards 11 is a pair of hangers 37 which carry rack guides 38. The upper ends of the standards 11 also carry a rack guide 39. Spaced and confronting rack bars 40 are slidably mounted in these guides and a gear 41 is located between the bars 40 and meshes with these bars so that revolution of this gear causes movement of the bars 40 in opposite directions. The bars 40 carry the forks 34 so that the pairs of gears 31 and 32 may be simultaneously moved into and out of their various positions.

The gear 41 is fixed on the end of a control shaft 42 which extends forward through a stuffing box 45, being supported in bearings 44. The steering part of the vehicle carries brackets 45 wherein is mounted a shaft 46 geared to the shaft 42 as at 47 and provided on its upper end with an operating lever 47. Thus by shifting the operating lever 47 in one direction or the other the gears 31 and 32 may be moved to any of the positions above described.

The modification shown in Figure 7 operates in substantially the same manner as that shown in Figure 6 except that the gear 32 is replaced by gear 32ᵃ having a toothed clutch part 32ᵇ and the gear 30 is replaced by a narrower gear 30ᵃ having a toothed clutch part 30ᵇ so that when the clutch parts 32ᵇ and 30ᵇ are engaged the differential shafts 18 and 20 will be clutched directly to the axle sections 23.

As shown in Figure 8 the upright members 11 are set back from the front plate 10ᵃ so that passages are left between these members and the front plate through which grease may clearly pass.

It is to be understood that the reversing mechanism in the device as here shown, is located at the forward end of the shaft 25. This mechanism is not there shown as is common to motor vehicle drives. However, should it be desirable so to do, it is obvious that a reversing mechanism may be mounted in the casing 10 in which case the forward reversing mechanism would not be used.

Obviously the entire housing 10 will be packed with grease and suitable packing means will be provided at all places where grease may escape, such means being common in the art and not being deemed necessary here to be shown since the specific means are not necessary to an understanding of the novel features of this invention.

What is claimed is:

1. In a rear axle gear shift, a rear axle housing, a differential gearing therein adopted to be motor driven and including a pair of alined laterally extending shafts, a pair of axles journalled in the ends of the housing and alined with the first shafts, a pair of jack shafts journalled in the housing parallel to the first shafts, gearing permanently connecting the jack shafts and axles including a gear fixed on each axle, change speed gearing on each jack shaft and a corresponding first mentioned shaft and including gears splined on the latter, a pair of confronting rack bars, means for actuating the rack bars in opposite directions simultaneously and including a gear therebetween and gear actuating means, and shipper forks carried by the rack bars and engaging the splined gears to move said gears along their shafts.

2. In a rear axle gear shift, a rear axle housing, a differential gearing therein adopted to be motor driven and including a pair of alined laterally extending shafts, a pair of axles journalled in the ends of the housing and alined with the first shafts, a pair of jack shafts journalled in the housing parallel to the first shafts, gearing permanently connecting the jack shafts and axles including a gear fixed on each axle, a pair of spaced gears fixed on each jack shaft comprising an inner large gear and an outer small gear, a pair of connected gears splined on each of the first pair of shafts and adapted to mesh respectively with the pair of gears on the corresponding gears on the jack shaft, a pair of confronting rack bars, means for actuating the rack bars in opposite directions including a gear therebetween and gear actuating means, and shipper forks carried by the rack bars and engaging the pairs of gears on the first shafts.

3. In a rear axle gear shift, a rear axle housing, a differential gearing therein adopted to be motor driven and including a pair of alined laterally extending shafts, a pair of axles journalled in the ends of the housing and alined with the first shafts, a pair of jack shafts journalled in the housing parallel to the first shafts, gearing permanently connecting the jack shafts and axles including a gear fixed on each axle, a pair of spaced gears fixed on each jack shaft comprising an inner large gear and an outer small gear, a pair of connected gears splined on each of the first pair of shafts and adapted to mesh respectively with the pair of gears on the corresponding gears on the jack shaft, a pair of confronting rack bars, means for actuating the rack bars in opposite directions including a gear therebetween and gear actuating means, and shipper forks carried by the rack bars and engaging the pairs of gears on the first shafts, said gears on the jack shafts being spaced to permit the pairs on the first shafts to lie between them without engagement.

4. In a rear axle gear shift, a rear axle housing, a differential gearing therein adopted to be motor driven and including a pair of alined laterally extending shafts, a pair of axles journalled in the ends of the housing and alined with the first shafts, a pair of jack shafts journalled in the housing parallel to the first shafts, gearing permanently connecting the jack shafts and axles including a gear fixed on each axle, a pair of spaced gears fixed on each jack shaft comprising an inner large gear and an outer small gear, a pair of connected gears splined on each of the first pair of shafts and adapted to mesh respectively with the pair of gears on the corresponding gears on the jack shaft, a pair of confronting rack bars, means for actuating the rack bars in opposite directions including a gear therebetween and gear actuating means, and shipper forks carried by the rack bars and engaging the pairs of gears on the first shafts, said gears on the jack shafts being spaced to permit the pairs on the first shafts to lie between them without engagement.

5. In a rear axle gear shift, a rear axle housing, a differential gearing therein adopted to be motor driven and including a pair of alined laterally extending shafts, a pair of axles journalled in the ends of the housing and alined with the first shafts, a pair of jack shafts journalled in the housing parallel to the first shafts, gearing permanently connecting the jack shafts and axles including a gear fixed on each axle, a pair of spaced gears fixed on each jack shaft comprising an inner large gear and an outer small gear, a pair of connected gears splined on each of the first pair of shafts and adapted to mesh respectively with the pair of gears on the corresponding gears on the jack shaft, a pair of confronting rack bars, means for actuating the rack bars in opposite directions including a gear therebetween and gear actuating means, and shipper forks carried by the rack bars and engaging the pairs of gears on the first shafts, said gears on the jack shafts being spaced to permit the pairs on the first shafts to lie between them without engagement, the outer gear on each first shaft being and the gear on each axle being provided with coacting toothed clutch means for positive engagement of the two.

6. In a rear axle gear shift, a rear axle housing, a differential gearing therein adapted to be motor driven and including a pair of alined laterally extending shafts, means for mounting said pair of shafts spaced from one side of the housing to permit passage of grease between said side and said means, a pair of axles journalled in the ends of the housing and alined with the first shafts, a pair of jack shafts journalled in the housing parallel to the first shafts, gearing permanently connecting the jack shafts and axles including a gear fixed on each axle, a pair of spaced gears fixed on each jack shaft comprising an inner large gear and an outer small gear, a pair of connected gears splined on each of the first pair of shafts and adapted to mesh respectively with the pair of gears on the corresponding gears on the jack shaft, a pair of confronting rack bars, a gear between said rack bars and meshing therewith, means to actuate the last mentioned gear and thereby to cause movement in opposite directions of said rack bars simultaneously, and shipper forks carried by the rack bars and engaging the splined gears to move said gears along their shafts.

FREDERICK C. KNAUER.
CHARLES P. DIEHL.